United States Patent
Yokozawa (10) Patent No.: US 7,606,664 B2
(45) Date of Patent: Oct. 20, 2009

(54) GUIDANCE INFORMATION SYSTEM AND PORTABLE DEVICE

(75) Inventor: Yukio Yokozawa, Shiojiri (JP)

(73) Assignee: Seiko Epson Corporation (JP)

( * ) Notice: Subject to any disclaimer, the term of this patent is extended or adjusted under 35 U.S.C. 154(b) by 636 days.

(21) Appl. No.: 11/305,470

(22) Filed: Dec. 16, 2005

(65) Prior Publication Data

US 2006/0136129 A1  Jun. 22, 2006

(30) Foreign Application Priority Data

Dec. 17, 2004  (JP) ............................. 2004-365517

(51) Int. Cl.
  G01C 21/30 (2006.01)
  G01C 21/00 (2006.01)
  G08G 1/123 (2006.01)

(52) U.S. Cl. .................. 701/211; 701/213; 701/200; 340/995.2

(58) Field of Classification Search .............. 701/200, 701/201, 207, 211
See application file for complete search history.

(56) References Cited

U.S. PATENT DOCUMENTS 7,487,042 B2 * 2/2009 Odamura ................ 701/213
2004/0138952 A1 * 7/2004 Seet et al. ................ 705/14
2005/0167504 A1 * 8/2005 Meier et al. ............ 235/462.45
2005/0222767 A1 * 10/2005 Odamura ................ 701/213

\* cited by examiner

Primary Examiner—Mark Hellner
Assistant Examiner—Helal A Algahaim
(74) Attorney, Agent, or Firm—Harness, Dickey & Pierce, P.L.C.

(57) ABSTRACT

A guidance information system includes: a portable device including an image pickup section and functioning to decode coded-pattern information captured by the image pickup section; and a display that displays information indicative of a destination point according to the coding system of coded-pattern information for use in the portable device. The portable device includes: a section detecting relative change of the portable device position without contact; a section decoding specified coded-pattern information captured by the image pickup section to obtain coordinate-position information of the destination point; a section obtaining map information corresponding to the coordinate-position information; a section obtaining information on the present position based on the output of the relative-position detection section; and a section generating guidance information for guidance from the present position to the destination point based on information including the coordinate-position information, map information, and the present position information.

4 Claims, 8 Drawing Sheets

GUIDANCE INFORMATION SYSTEM AND PORTABLE DEVICE

BACKGROUND

1. Technical Field

The present invention relates to a guidance information system for guiding the user of a portable device to a destination and a portable device, and in particular, it relates to a guidance information system having a sheet that carries coded pattern information indicative of destinations, in which the user reads the information indicative of the destination by capturing the information on the sheet with an image pickup section of the portable device to navigate a route to the read destination with the portable device, and to a portable device for use in the guidance information system.

2. Related Art

Various navigation systems for humans called human navigation systems have been proposed as portable radio terminals such as mobile phones. One example of the systems is a system in which when a user connects to a receiving unit using the portable radio terminal via a base station through a line, control means in the portable radio terminal obtains its present-position information by position detection means that detects its own position by a global positioning system (GPS), sends the information, and also receives the present-position information of the receiving unit, and displays the present-position information of both units on a display means as a position on a map.

Thus, the user of the portable radio terminal can recognize the present position of the receiving unit, depending on the position on a map. Accordingly, in the case where the user has a promise to meet a person, the user can get the convenience of knowing the position for meeting the person on the receiving side using the map or by indicating an appropriate position to meet. Since the present-position information is updated from moment to moment, the user can know the present position each time. Also, the route and distance to meet the receiving-side person can be calculated, and the time required can be estimated (refer to Patent Document 1: JP-A-2001-289664, paragraphs 0006-0011, FIGS. 1, 3).

Another system has been proposed in which an optical information code (a two-dimensional barcode) serving as position display means, which is provided on a utility pole or the like, is read using the image pickup means of a portable terminal, the positional information of this point is transmitted to map-information providing means via a communication network, corresponding map information is provided via the communication network in response to the transmission, and the received map information is displayed on the display means of the portable terminal, whereby the present position can be grasped from the displayed map information (refer to Patent Document 2: JP-A-2004-213191, paragraphs 0020-0024, FIGS. 1, 5-9).

Furthermore, the applicant has proposed a technique of capturing a two-dimensional barcode indicative of the position of a destination (the latitude and longitude), which is adhered to a map, with the image pickup means of a mobile phone, and decoding the captured image data to obtain the positional information of the destination, and on the other hand, calculating the present-position information (the latitude and longitude) of the mobile phone from a received GPS signal, calculating the distance and direction from the present position to the destination, and displaying the calculation results on a display (refer to Patent Document 3: JP-A-2004-221819, paragraphs 0012-0013, FIG. 1).

The applicant has also proposed a technique of capturing a QR code (registered trademark) that is displayed on the display of a position-display tag unit having the function of obtaining the positional information of itself, which is disposed on a desired point, with the camera of a head-mount display unit, and reading positional information from the captured image. Here, the applicant has also proposed correction of cumulative errors of positional information obtained by a separate movement-detection sensor such as an inertia sensor or an acceleration sensor (or a gyroscope) (refer to Patent Document 4: JP-A-2004-257872, paragraphs 0018-0022, FIGS. 1, 2).

However, the above-described related arts are not sufficient to provide enough information having a map for guiding the user of a portable device to a destination.

For example, since the technique proposed in Patent Document 1 uses no image pickup means, it is impossible to capture specified coded-pattern information such as a two-dimensional barcode and decode it, and to obtain coordinate-position information of the destination on the earth from the decoded result without passing a complicated operation such as key entry. Accordingly, it is not easy to obtain map information corresponding to the coordinate-position information of the destination on the earth, so that it is difficult to obtain intelligible guidance information associated with a map to the destination.

In the technique proposed in Patent Document 2, an optical information code is read, and the map of the present position expressed by the information code is obtained. However, this is not the map of a destination, and the portable device has no sensor capable of detecting changes in the position of itself. Accordingly, it discloses no suggestion on guidance to the destination on the map. Furthermore, although Patent Document 3 discloses an idea of capturing a two-dimensional barcode indicative of the positional information of the destination on a map having the two-dimensional barcode, thereby eliminating a complicated operation such as entering information on the destination point with keys, it has no idea of obtaining a map from the exterior and using it. Accordingly, it has no idea of guiding the user to the destination on an obtained map.

The proposal of Patent Document 4 discloses a technique in which a position display tag always detects the position of itself and displays the detected position using a coded pattern, and the positional information is obtained by image pickup means. However, it does not propose an idea of obtaining information of not the present position but the destination, and obtaining the map of the destination from the exterior and displaying route-guidance information with a map.

SUMMARY

An advantage of some aspects of the invention is to provide a guidance information system capable of providing sufficient information with a map to guide the user of a portable device to a destination, and a portable device for use in the system.

A guidance information system according to a first aspect of the invention includes: at least one portable device including an image pickup section and the function of decoding coded-pattern information captured by the image pickup section; and a display having a display surface that displays information indicative of a destination point in a display form according to the coding system of coded-pattern information for use in the portable device. The portable device includes: a relative-position detection section that detects the relative change of the position of the portable device without contact;

a destination-position-information obtaining section that decodes specified coded-pattern information captured by the image pickup section to obtain the coordinate-position information of the destination point on the earth; a map-information obtaining section that obtains map information corresponding to the coordinate-position information on the earth obtained by the destination-position-information obtaining section; a present-position-information generating section that obtains information on the present position of the portable device on the basis of the output of the relative-position detection section; and a guidance-information generating section that generates guidance information for guidance from the present position to the destination point on the basis of various information including the coordinate-position information on the earth obtained by the destination-position-information obtaining section, the map information obtained by the map-information obtaining section, and the information on the present position of the portable device generated by the present-position-information generating section.

With the guidance information system, the portable device captures and decodes specific coded-pattern information displayed on the display to thereby obtain the coordinate-position information of the destination point on the earth, and furthermore, it obtains map information corresponding to the coordinate-position information of the destination point on the earth. The portable device further obtains information on the present position of the portable device on the basis of the output of the relative-position detection section, and generates guidance information for guidance to the destination point from the coordinate-position information of the destination point on the earth, the map information, and the present-position information.

The user of the system can obtain the coordinate-position information of the destination point on the earth, and accordingly, can obtain corresponding map information appropriately without the need for complicated operation such as key entry only by capturing coded-pattern information, and so can receive a guidance to the destination point on the basis of the map information thus obtained appropriately while recognizing the present-position information.

It is preferable that the display carries coded-pattern information indicative of a destination point on a sheet-like member.

Since the coded-pattern information indicative of a destination point is displayed on a sheet-like member, desired coded-pattern information can be captured in a form that is easy for the user of this system to recognize and select the destination, allowing correct acquisition of information for the subsequent decoding, acquisition of map information, and acquisition of guidance information.

It is preferable that the display carry coded-pattern information indicative of a destination point on a book-like plurality of sheets.

Since the coded-pattern information indicative of a destination point is displayed on book-like sheets, desired coded-pattern information can be captured in the form that is easy for the user of this system to recognize and select the destination, allowing correct acquisition of information for the subsequent decoding, acquisition of map information, and acquisition of guidance information.

It is preferable that the display carry coded-pattern information indicative of a destination point on a corresponding portion on a map.

Since the coded-pattern information indicative of destination points is displayed on a corresponding portion on a map, desired coded-pattern information can be captured in the form that is easy for the user of this system to recognize and select the destination, allowing correct acquisition of information for the subsequent decoding, acquisition of map information, and acquisition of guidance information.

It is preferable that the display carry coded-pattern information to which an error-correction code is added.

Since the coded-pattern information indicative of a destination point contains an error-correction code, the possibility of generating a recognition error due to partial stain etc can be reduced.

A portable device according to a second aspect of the invention includes an image pickup section. The portable device includes: a relative-position detection section that detects the relative change of the position of the portable device without contact; a destination-position-information obtaining section that decodes specified coded-pattern information captured by the image pickup section to obtain the coordinate-position information of a destination point on the earth; a map-information obtaining section that obtains map information corresponding to the coordinate-position information on the earth obtained by the destination-position-information obtaining section; a present-position-information generating section that obtains information on the present position of the portable device on the basis of the output of the relative-position detection section; and a guidance-information generating section that generates guidance information for guidance from the present position to the destination point on the basis of various information including the coordinate-position information on the earth obtained by the destination-position-information obtaining section, the map information obtained by the map-information obtaining section, and the information on the present position of the portable device generated by the present-position-information generating section.

The portable device captures and decodes specific coded-pattern information displayed on the display by the image pickup section to thereby obtain the coordinate-position information of the destination point on the earth, and furthermore, it obtains map information corresponding to the coordinate-position information of the destination point on the earth. The portable device further obtains information on the present position of the portable device on the basis of the output of the relative-position detection section, and generates guidance information for guidance to the destination point from the coordinate-position information of the destination point on the earth, the map information, and the present-position information.

The user of the system can obtain the coordinate-position information of the destination point on the earth, and accordingly, can obtain corresponding map information appropriately from the result of the decoding without the need for complicated operation such as key entry only by capturing coded-pattern information, and so can receive a guidance to the destination point on the basis of the map information thus obtained appropriately while recognizing the present-position information.

It is preferable that the destination-position-information obtaining section further obtain detailed information of a specific point in a region as the initial destination point from the specified coded-pattern information captured by the image pickup section; and that the map-information obtaining section obtain detailed map information on the specific point.

Thus, this embodiment allows acquisition of detailed map information on a specific point such as a shop in the initial destination region such as a shopping mall, so that the user can obtain guide information to a specific point such as a shop in the destination region. This further increases convenience.

It is preferable that the portable device further include a calibration-information obtaining section that can decode the specific coded-pattern information captured by the image pickup section to obtain calibration information for the coordinate-position information on the earth of the present position of the portable device; and that the present-position-information generating section calibrate the information on the present position of the portable device obtained on the basis of the output of the relative-position detection section according to the calibration information obtained by the calibration-information obtaining section.

This can reset cumulative errors contained in the present-position information on the portable device on the basis of the calibration information, thus maintaining the accuracy of the positional information.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to the drawings. In the following drawings, principal essential parts are exaggerated and parts other than the essential parts are simplified or omitted as appropriate for the convenience of description.

Figure 1:
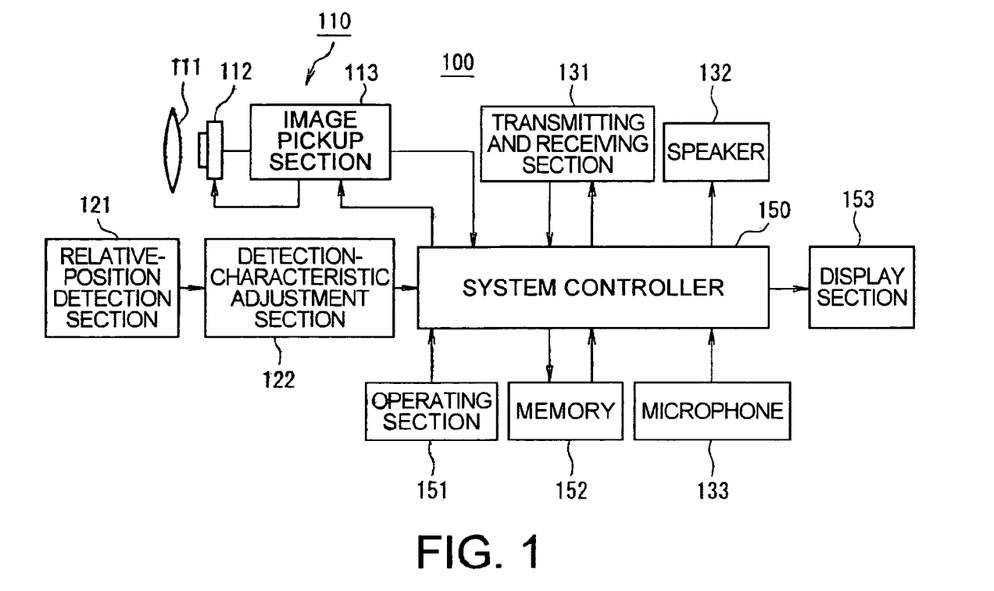
FIG. 1 is a block diagram of a portable device according to an embodiment of the invention.

FIG. 1 is a block diagram of a portable device 100 according to an embodiment of the invention. Referring to FIG. 1, an optical image of a subject imaged on the image-pickup surface of an image pickup device 112 through a lens 111 is converted to electrical form by the image pickup device 112. The photoelectrically converted output of the image pickup device 112 is supplied to an image pickup section 113. The supplied signal is converted to image data in the form suitable to the subsequent process by the image pickup section 113. The converted image data is input to a system controller 150 to be described later.

The system controller 150 gives an instruction to the image pickup section 113 to allow it to control image pickup operation such as adjusting the timing of a trigger (to drive the image pickup device 112). The image pickup section 113 drives the image pickup device 112 to activate a what-is-called device shutter according to the instruction. The image pickup device 112 executes an image pickup operation (accumulation and reading of photocharge) responsive to that. The lens 111, the image pickup device 112, the image pickup section 113, and a corresponding function part of the system controller 150 construct a camera 110 for imaging a subject.

The portable device 100 also includes a relative-position detection section 121 having a known inertia sensor that detects the relative change of its position and a what-is-called gyroscope without contact. The portable device 100 further includes a detection-characteristic adjustment section 122 that adjusts the detection characteristic of the relative-position detection section 121 by filtering or the like. The detection-characteristic adjustment section 122 connects to the system controller 150 so as to provide its output to the system controller 150.

While the detection output from the relative-position detection section 121 corresponds to the relative change of its position, information on the present position can be obtained by appropriate operation such as time quadrature.

The portable device 100 of this embodiment has a structure also serving as a mobile phone, and includes a transmitting and receiving section 131 that transmits and receives a signal to/from external units; a speaker 132 serving as a receiver; and a microphone 133 serving as a transmitter, which connect to the system controller 150 that converts a signal to be transmitted. The transmitting and receiving section 131 transmits and receives data of images and other data in addition to signals for conversation.

The portable device 100 further includes an operating section 151 that receives various operations for using the portable device 100; a memory 152 that accumulates information (data) readably; and a display section 153 including a liquid-crystal display for various displays, which connect to the system controller 150. The system controller 150 is an integrated circuit having the function of processing information, and mainly includes a microprocessor. The system controller 150 controls the circuitry of the portable device 100 as a whole to allow required signal conversion and image processing. The corresponding function part of the system controller 150 serves as destination-position-information obtaining means that decodes coded-pattern information captured by the camera 110 to obtain the coordinate-position information of the destination point on the earth.

Figure 2:
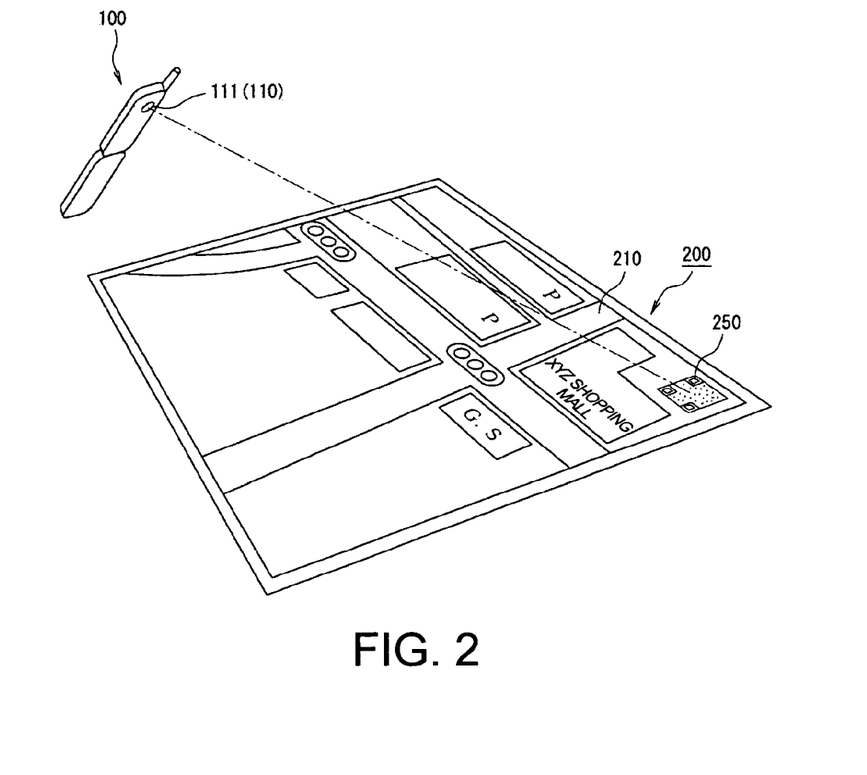
FIG. 2 is a conceptual diagram showing acquisition of data on a destination point by image pickup using the portable device having the structure of FIG. 1.

FIG. 2 is a conceptual diagram showing acquisition of data of a destination point by image pickup using the portable device 100 having the structure of FIG. 1. Referring to FIG. 2, a sheet-like map 210 serving as a display 200 contains coordinate-position information of candidates for a destination point on the earth in the form of coded-pattern information 250 such as two-dimensional barcodes suitable for the portable device 100. The coded-pattern information 250 is captured by the camera 110 (numeral 111 indicates its lens) of the portable device 100.

In other words, the sheet-like map 210 of this embodiment is a display having a display surface for displaying information indicative a destination point in a display form based on the code system of coded-pattern information for use in the portable device 100. The illustration shows that the coded-pattern information 250 of a displayed destination point (a shopping mall) is captured, and the captured coded-pattern information 250 is decoded by the above-described codedpattern-information decoding function, thereby providing the coordinate-position information of the destination point on the earth.

In this embodiment, coordinate-position information indicative of a destination point is displayed on a sheet-like map, and in particular, the pattern information is displayed on a corresponding portion on the map. Accordingly, desired coded-pattern information can be captured in such a form that the user of this system can easily recognize and select the destination, allowing correct acquisition of information for the subsequent decoding, acquisition of map information, and acquisition of guidance information.

Figure 3:
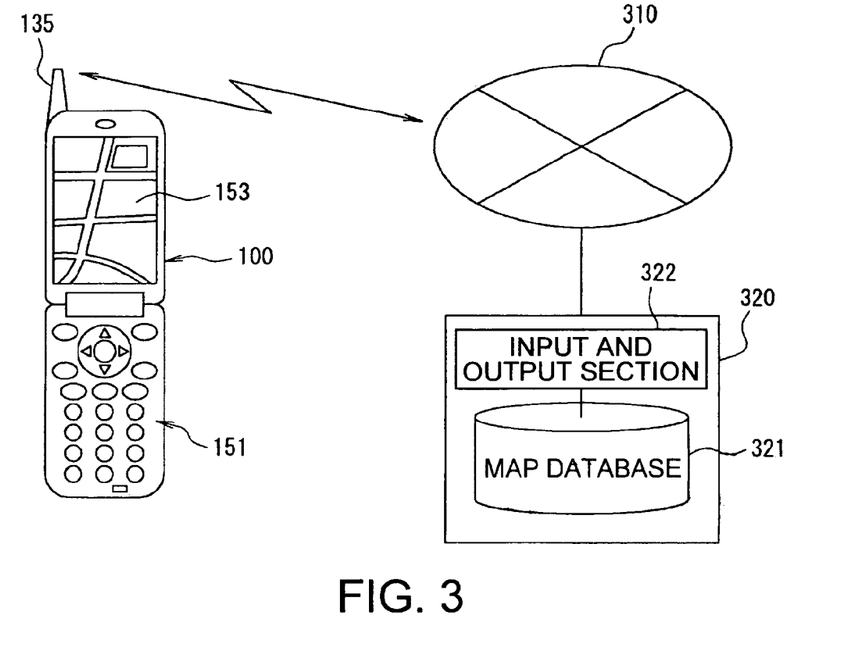
FIG. 3 is a conceptual diagram illustrating acquisition of map information from an external database via the Internet in the portable device according to the embodiment.

FIG. 3 is a conceptual diagram illustrating acquisition of map information from an external database via the Internet in the portable device 100 of this embodiment. Referring to FIG. 3, the mobile phone that is the portable device 100 of the embodiment of the invention includes an antenna 135 connecting to the transmitting and receiving section 131, described with reference to FIG. 1. The mobile phone can communicate with a base station via the antenna 135 by radio, allowing connection to the Internet 310, like known mobile phones.

The system is equipped with a server 320 that includes a database 321 connected to the Internet 310 via an input and output section 322. The database 321 stores map information corresponding to the coordinate-position information of the destination point on the earth, described with reference to FIGS. 1 and 2. The portable device 100 therefore can access an appropriate site via the Internet 310 to search the database 321 in the corresponding server 320 for map information corresponding to the coordinate-position information of the destination point on the earth, and can obtain it, like known mobile phones.

In other words, in this embodiment, coded-pattern information indicative of the destination point displayed on a display, for example, in the form of a map, described with reference to FIG. 2, is captured by the camera 110; the captured coded-pattern information is decoded to obtain destination-position information that is the coordinate-position information of the destination point on the earth; and thus map information (electronic data) corresponding to the destination-position information can be obtained via the Internet 310. The map information obtained as electronic data can be similar in content to the initial printed sheet-like map on the display. However, it may not always be similar, but has a format suitable for guiding the user to the destination point.

Figure 4:
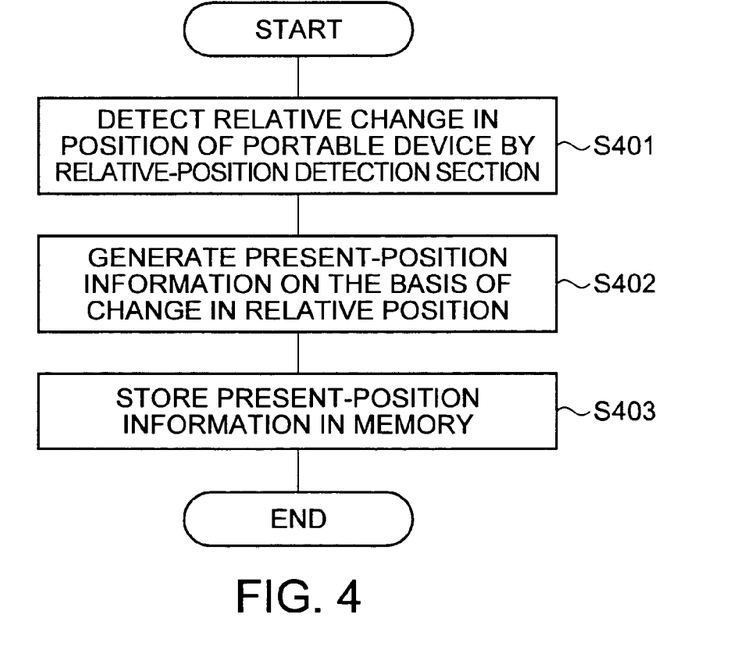
FIG. 4 is a flowchart of the process according to the embodiment.
Figure 5:
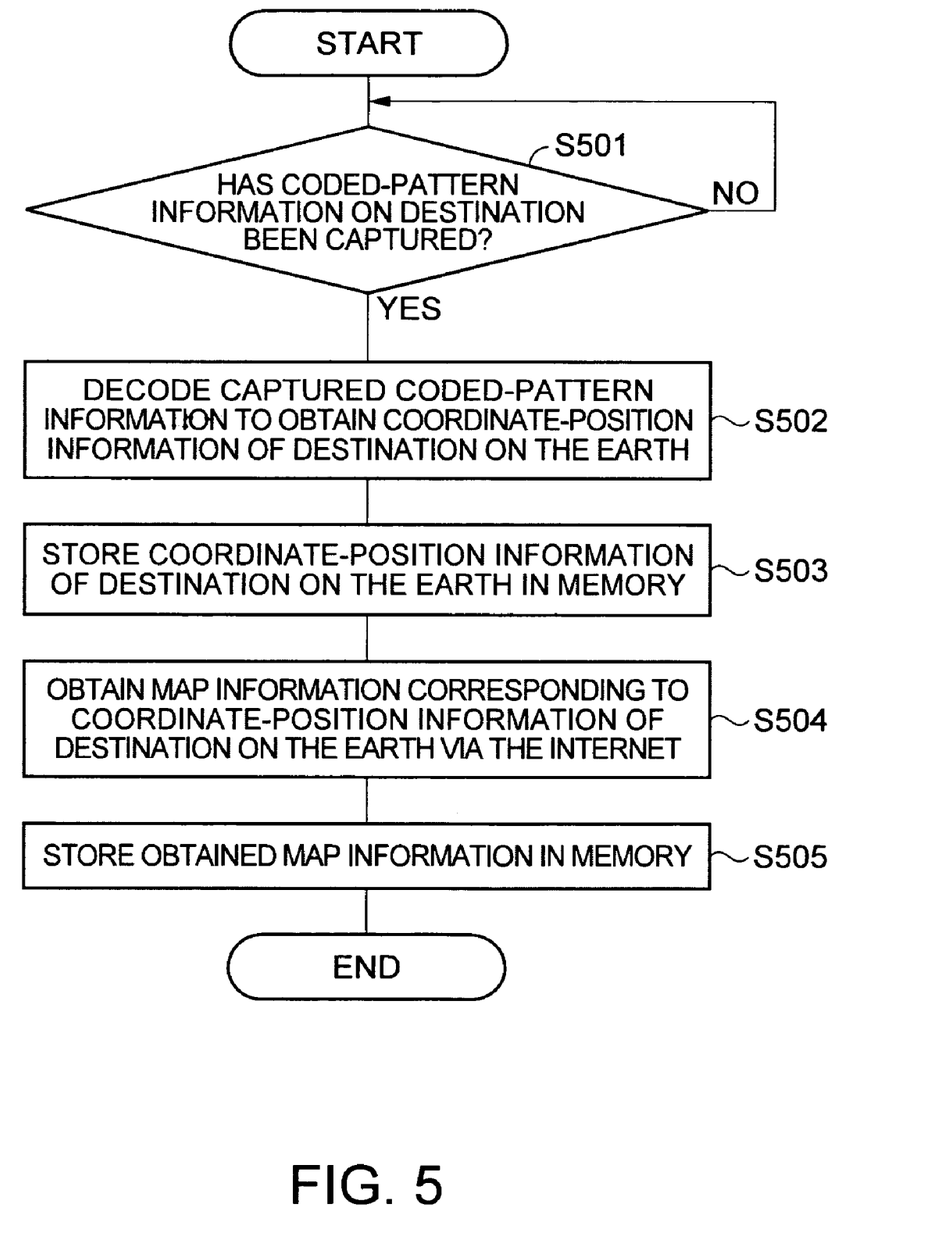
FIG. 5 is a flowchart of the process according to the embodiment.
Figure 6:
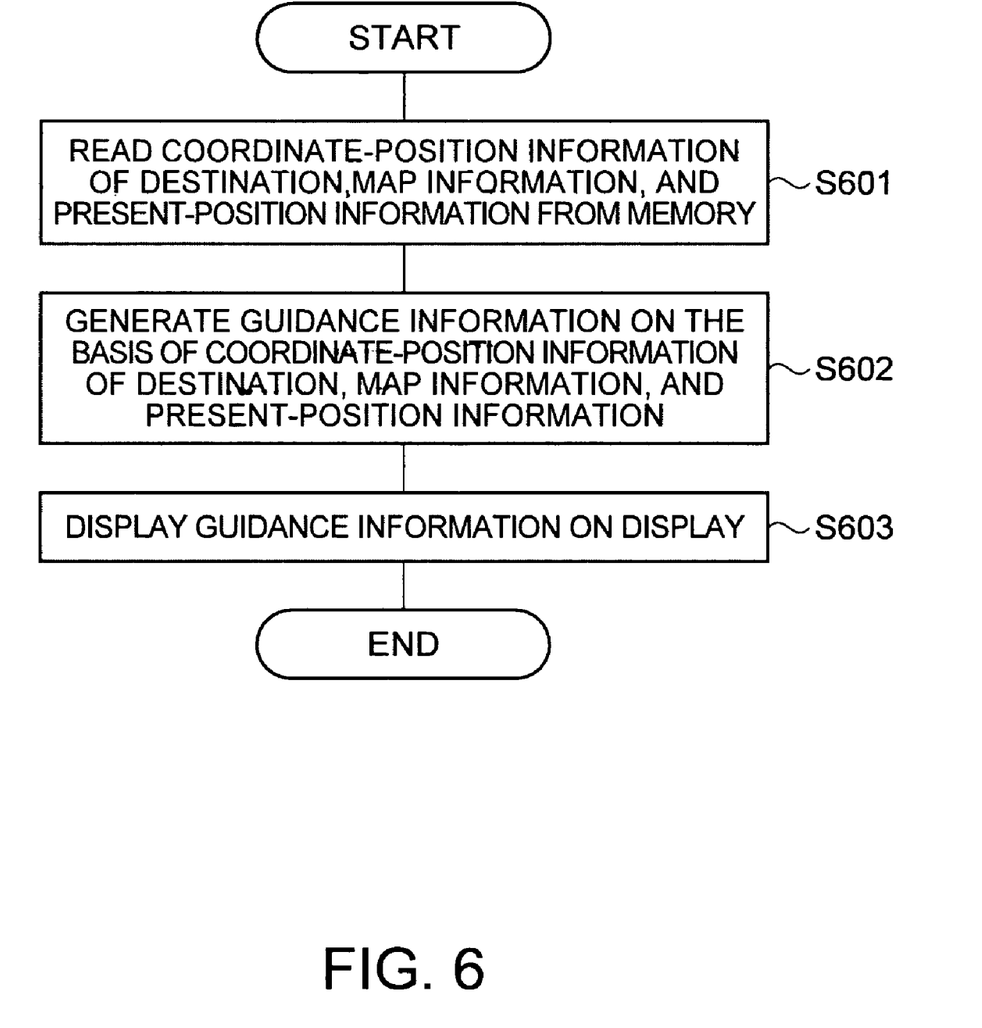
FIG. 6 is a flowchart of the process according to the embodiment.

FIGS. 4, 5, and 6 are flowcharts of the operation of the portable device 100 according to the embodiment of the invention described with reference to FIGS. 1 to 3. Among them, FIG. 4 shows the process of obtaining present-position information and storing the obtained information by the portable device 100. Upon activation of the portable device 100, the relative displacement of the portable device 100 is detected by the relative-position detection section 121, described with reference to FIG. 1, (S401), and is outputted via the detection-characteristic adjustment section 122 (inputted to the system controller 150).

A present-position-information generation section generates present-position information indicative of the present position by appropriate operation such as time quadrature (S402) on the basis of the detected output. The present-position information generated in step S402 is stored in a memory (S403), thus completing the process of obtaining and storing present-position information. In this embodiment, the present-position-information generation section is a corresponding function part of the system controller 150.

FIG. 5 is a flowchart of the process of obtaining map information corresponding to the coordinate-position information of a destination point on the earth. After the activation of the portable device 100, the pickup of the coded-pattern information of the destination point is waited for, the coded-pattern information being displayed, for example, on the sheet-like map, described with reference to FIG. 2, by the camera 110 (the lens 111, the image pickup device 112, the image pickup section 113, and the corresponding function part of the system controller 150) (S501). After the pickup operation, a destination-position-information obtaining section that is the corresponding function part of the system controller 150 decodes the coded-pattern information to obtain the coordinate-position information of the destination point on the earth (S502), and the information is stored in the memory (S503).

Next, as has been described with reference to FIG. 3, map information corresponding to the coordinate-position information of the destination point on the earth, which is obtained in step S502 and stored in the memory in step S503, is obtained via the internet (S504), and the obtained map information is stored in the memory (S505). Thus, the process of obtaining map information corresponding to the coordinate-position information of the destination point on the earth is completed by the process from step S501 to step S505.

FIG. 6 is a flowchart of the process of generating guidance information for guiding the user from a present position to a destination point on the basis of the information obtained by the process of FIG. 4 and the information obtained by the process of FIG. 5 and displaying it. The coordinate-position information of the destination point on the earth and the map information corresponding thereto, which are obtained by the process of FIG. 5, and the present-position information on the portable device 100, which is obtained by the process of FIG. 4, are read from the memory (S601). Corresponding guidance information is generated by a guidance-information generating section that is a corresponding function part of the system controller 150 on the basis of these read information (S602), and the generated guidance information is displayed on the display section 153 (S603).

Since the system of the embodiment functions as described above, the user of the system can obtain the coordinate-position information of the destination point on the earth, and accordingly, can obtain corresponding map information appropriately without the need for complicated operation such as key entry only by capturing coded-pattern information containing the information corresponding to the destination point using the camera of the portable device, and so can receive a guidance to the destination point on the basis of the map information thus obtained appropriately while recognizing the present-position information.

Figure 7:
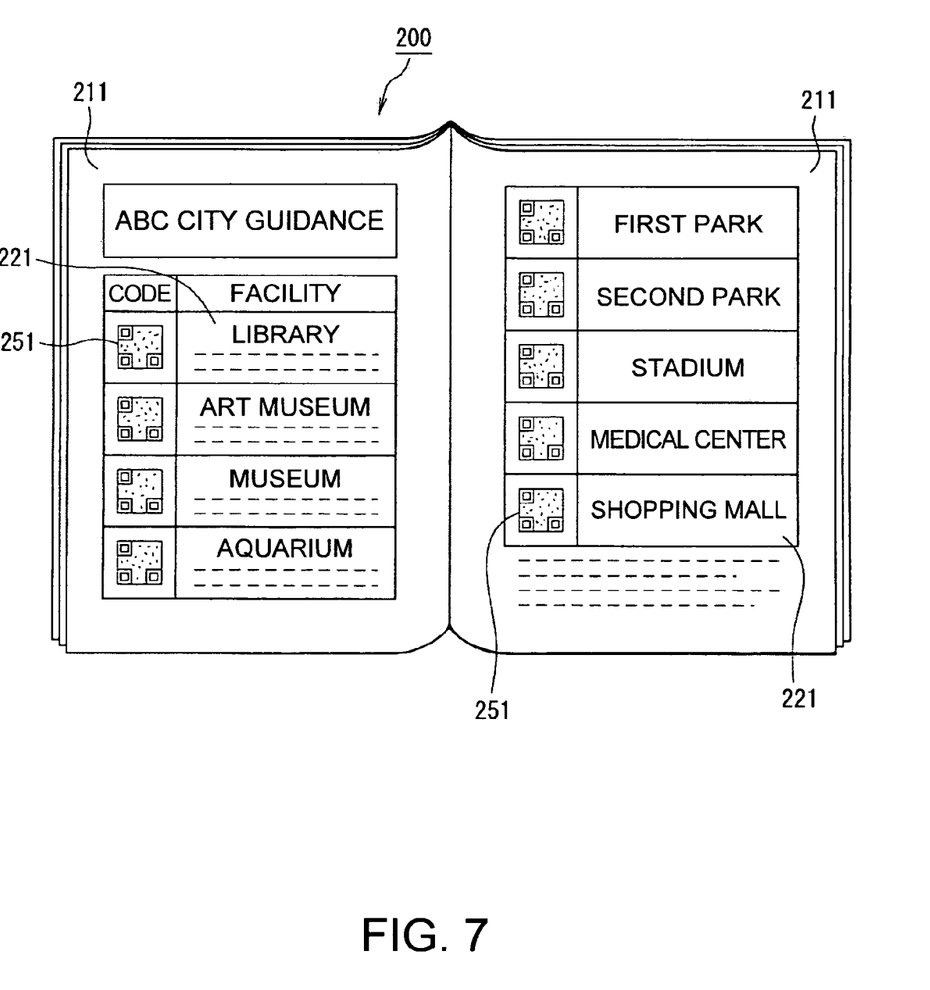
FIG. 7 is a diagram of another example of the display used in the guidance information system according to the embodiment.

FIG. 7 is a diagram of another example of the display 200 used in the guidance information system according to the embodiment of the invention. The display 200 of this example is shaped like a book in which coded-pattern information 251 indicative of destinations is displayed on a plurality of sheets 211. The example in the drawing shows a table of guidance information and corresponding coded-pattern information 251. The guidance information includes destinations 221 expressed by characters, such as a library, museum, aquarium, and shopping mall; and the coded-pattern information 251 such as two-dimensional barcodes are printed on the left column of the guidance information on book-like sheets 211.

Since the coded-pattern information indicative of destination points is displayed on the book-like sheets, desired coded-pattern information can be captured in such a form that the user of the system can easily recognize and select the destination. When the user opens an appropriate page and captures coded-pattern information on a desired destination with the foregoing camera of the portable device, the portable device obtains the coordinate-position information of the destination point on the earth, as described above, and further obtains map information corresponding to the coordinate-position information of the destination point on the earth, and generates guidance information for guiding the user to the destination on the basis of such information and the present-position information and displays it on its display, thereby guiding the user to the destination point.

Even when a plurality of coded-pattern information is displayed in relative proximity in one page, desired coded-pattern information can be read by the camera and the subsequent image processor (a corresponding function part of the system controller 150) without confusion with other information by directing the lens so that the desired coded-pattern information is located in the center of the image-pickup field. This technique is known to those skilled in the art; this also applies to a display that will be described later with reference to FIG. 8.

Figure 8:
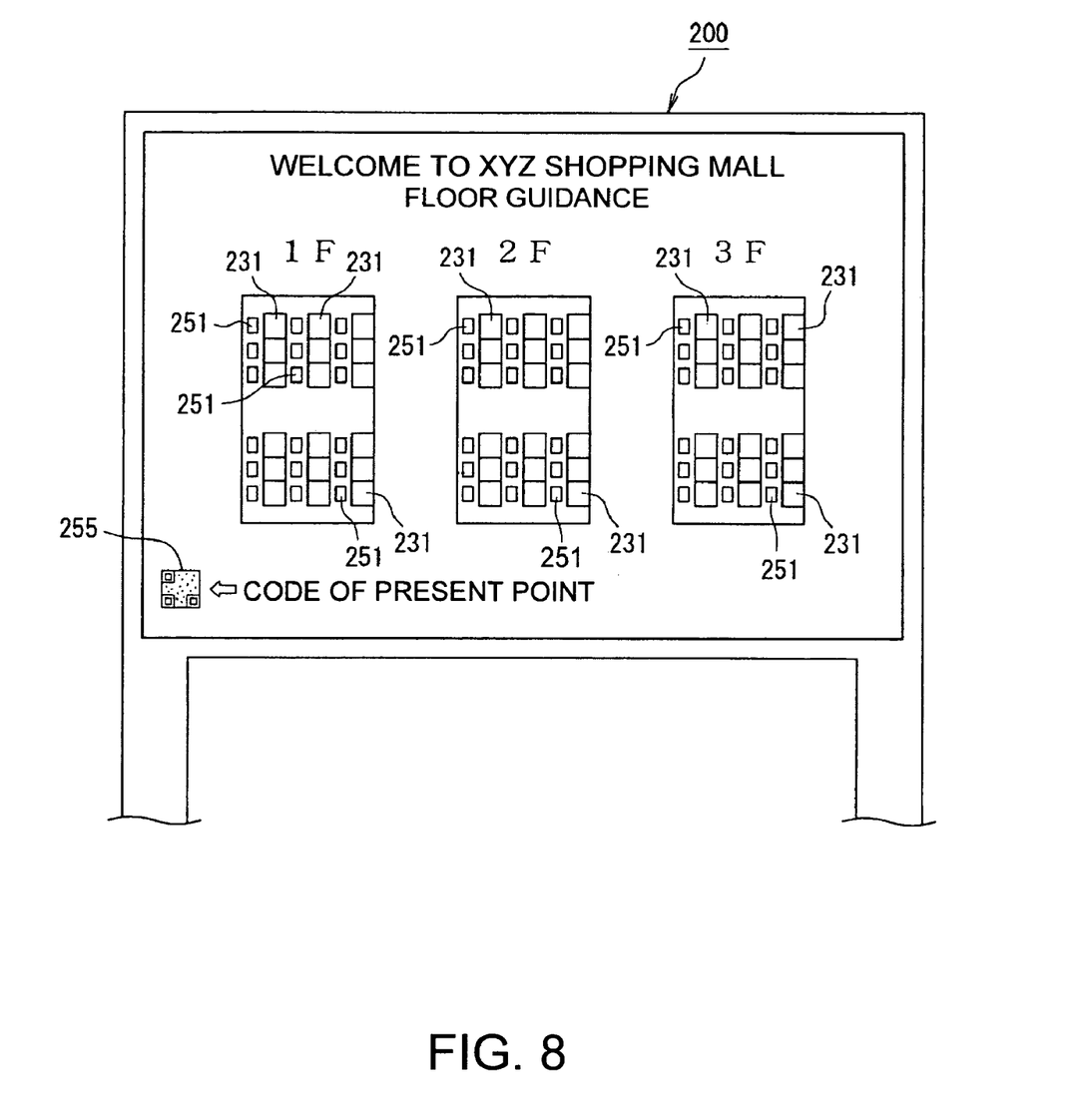
FIG. 8 is a diagram of a display according to another embodiment of the invention.

FIG. 8 is a diagram of a display according to another embodiment of the invention. The example of FIG. 8 shows a display for a relatively wide area, such as a shopping mall, for use in providing guidance information associated with a finely divided layout in the area that contains the locations of individual shops on each floor. Such a display can be placed in an appropriate location, or locations, close to a passage common to visitors, such as the gate or entrance of a shopping mall etc. in the form of a sign or a bulletin board.

FIG. 8 shows layouts of the first floor 1F, the second floor F2, and the third floor F3 under the sign "Floor Guidance". The layouts contain coded-pattern information 251 such as two-dimensional barcode corresponding to the shops along with the descriptions of each section 231 (at the head thereof), such as the names and sales items of the shops.

The characteristic of the display 200 in FIG. 8 is that there is coded-pattern information 255 such as a two-dimensional barcode, on the left lower part of the floor layouts, indicative of the location of the display 200 (the coordinate-position information on the earth). The coded-pattern information 255 contains information corresponding to the coordinate-position information on the earth indicative of a specific point for position detection, such as the gate or entrance of the shopping mall or a specific position on the landing, bottom, or top of stairs, or a specific position equipped with an elevator or an escalator.

The user can calibrate the present-position information held by the portable device 100, as will be described, by capturing the coded-pattern information 255 of the display 200 at the specific point for position detection by using the camera 110 of the portable device 100. Accordingly, the user can match the present-position information to the actual position itself without error at the position of the display 200, shown in FIG. 8, such as the gate or entrance of a shopping mall or a specific position on the landing, bottom, or top of stairs, or a specific position equipped with an elevator or an escalator, and then be guided to a desired shop or the like in the shopping mall while recognizing his/her accurate position.

Figure 9:
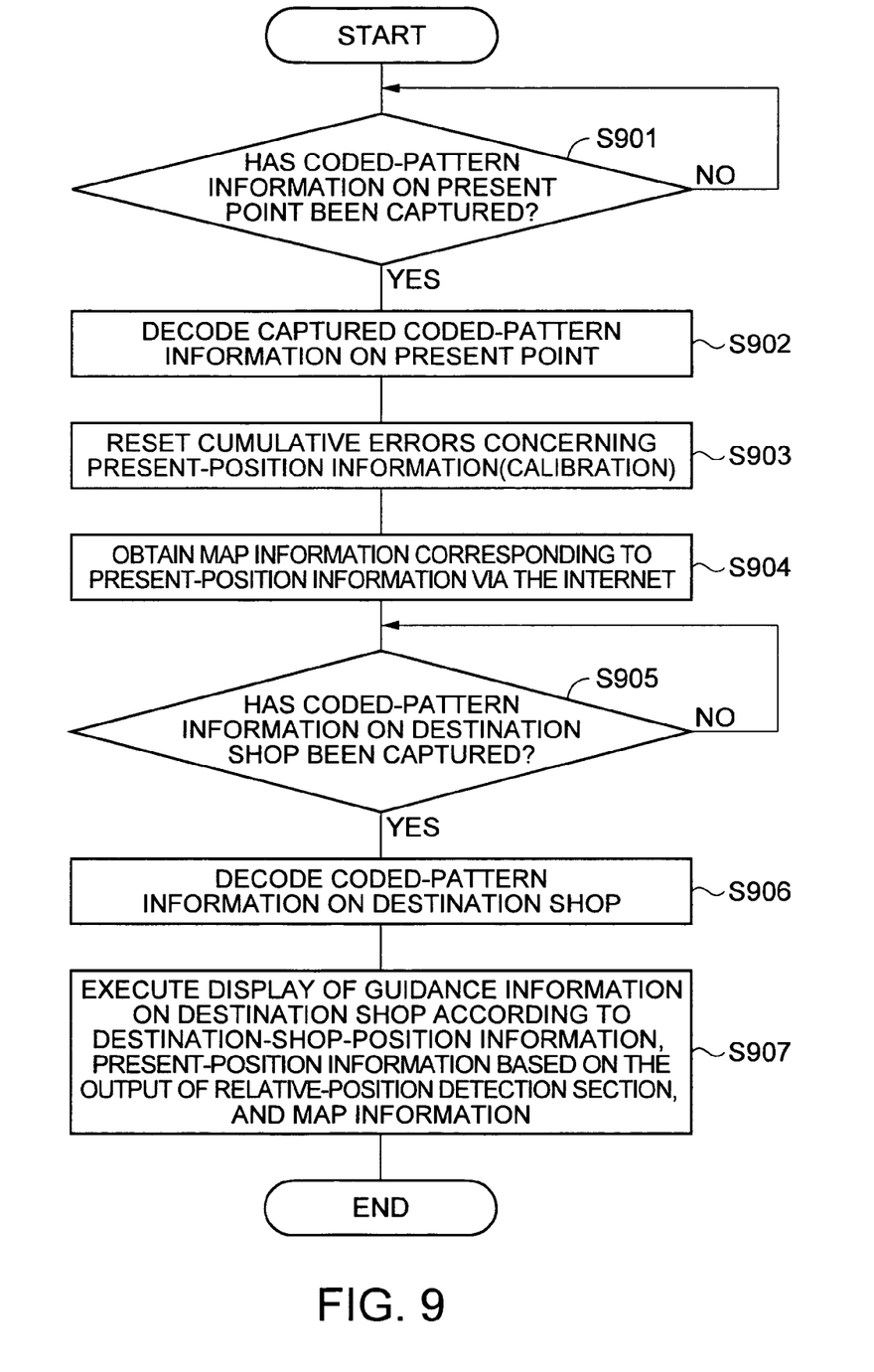
FIG. 9 is a flowchart for the process of detailed guidance in the neighborhood of a destination through calibration for the detection of the present position, according to the embodiment.

FIG. 9 is a flowchart for the process of detailed guidance in the neighborhood of the destination through calibration for the detection of the present position, according to the embodiment. Referring to FIG. 9, upon activation of the portable device 100, the procedure stands by the capture of the coded-pattern information 255, such as a two-dimensional barcode, indicative of the location of the display 200 (the coordinate-position information on the earth), described in FIG. 8, (S901). Upon completion of the capture, the captured coded-pattern information 255 is decoded to obtain the coordinate-position information on the earth of the display 200 (or electronic data indicative of the present position of the display 200) (S902).

Then, cumulative errors contained in the present-position information obtained by the relative-position detection section 121, the detection-characteristic adjustment section 122, and the corresponding function part of the system controller 150 in the portable device 100 described with reference to FIG. 1 are reset. In other words, the procedure executes calibration for the detection of the present position by the process of replacing the present-position information held until that time on the basis of the electronic data indicative of the present position of the display 200, which is obtained in step S902 (S903). To allow the above-described calibration, the memory of this embodiment has a capacity sufficient to further obtain information suitable to calibration in step S902, and the system controller 150 has an algorithm for information processing that allows the acquisition to construct a calibration-information obtaining section.

The portable device 100 of this example can thus recognize the position of itself at such exceedingly high accuracy that allows determination on which floor in the shopping mall it is present on the basis of the accurate present-position information obtained as described above up to step S903. Map information corresponding to the present position having exceedingly high accuracy is obtained by the foregoing method, described above with reference to FIG. 4 (S904).

For example, when the present position is recognized as the third floor of the shopping mall, the map information can be a layout for the third floor. The procedure stands by until the user captures the coded-pattern information 251 corresponding to the section of a specific shop on the display 200 of FIG. 8 (S905). Upon execution of the capture, the captured coded-pattern information is decoded to obtain the information on the position of the destination shop (S906).

Then information for guiding the user to the shop is generated on the basis of the information on the position of the destination shop, the present-position information, and the obtained map information, which are obtained by the procedure to step S906, and the information thus obtained is displayed on the display section 153 of the portable device 100 (S907). The user can thus be guided to a desired shop at high accuracy without going wrong by the guidance of the displayed detailed information that is limited to a specific region.

As described above, since the embodiment allows acquisition of detailed map information on a specific point such as a destination shop in, e.g., a shopping mall (since the memory of this embodiment has a capacity sufficient to further obtain detailed map information on a specific point, and the system controller has an algorithm for information processing that allows the acquisition), the user can obtain information as guidance to a specific point such as a shop in a destination region. Accordingly, convenience is further increased.

In the case in which the coded-pattern information 251 corresponding to each shop on the display 200 and the coded-pattern information 255 corresponding to a specific point for position detection are provided for the public, as shown in FIG. 8, the coded-pattern information may be stained or broken, or tampered. To cope with such situations to ensure the reliability of this system, the coded-pattern information may contain an error-correction code such as a CRC code, thereby reducing the possibility of generating a recognition error.

Figure 10:
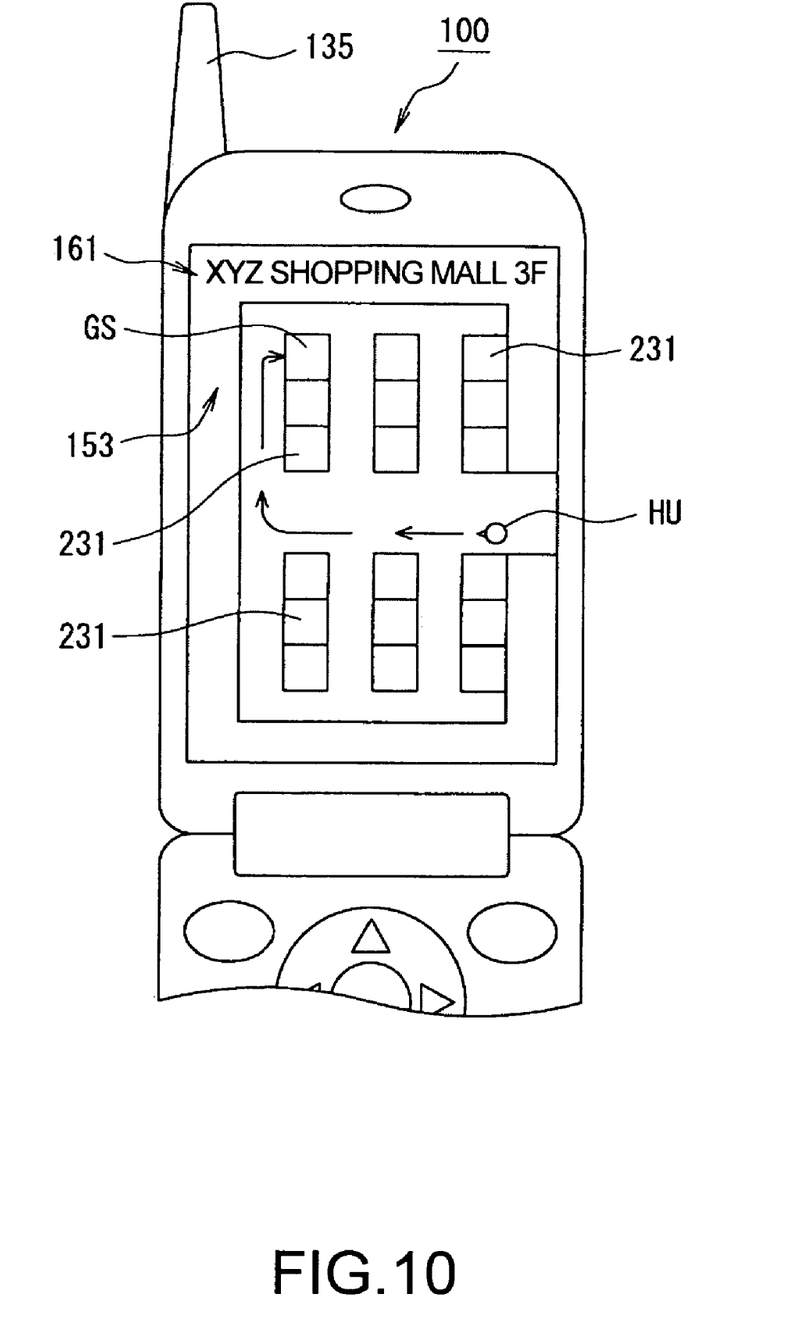
FIG. 10 is a diagram of an example of image display in the case of guiding the user to a desired point according to detailed information limited to a specific region.

FIG. 10 is a diagram of an example of image display in the case of guiding the user to a desired point according to detailed information limited to a specific region, in the embodiment described with reference to FIGS. 8 and 9. Referring to FIG. 10, the layout of the third floor of the shopping mall, described with reference to FIG. 8, is displayed as map information on the display section 153 of the portable device 100, and an indication 161 indicative of that the present screen shows the layout of the third floor is displayed at the upper end of the screen.

When a user's desired point is an imported goods store GS, which is now having a bargain sale, in the sections 231 of the third floor, the present position of the user is displayed by a symbol HU, and a route that guides the user is indicated by an arrow. As the user advances actually, the indication HU also moves in the screen. Thus, this embodiment allows acquisition of detailed map information on the destination in a shopping mall or the like, so that the user can obtain guide information to a specific point such as a shop in a destination region. Accordingly, convenience is further increased.

Once information on the present position of the user is calibrated in a specific point for position detection such as the gate or entrance of a shopping mall or a specific position on the landing, bottom, or top of stairs, or a specific position equipped with an elevator or an escalator, as described above, the accuracy of guidance can be held at high level in the neighborhood of the calibrated point.

Generally speaking, while map information can be obtained from the present various sites, it may be obtained as needed from map data for a vehicle navigation system, map data held by the Geographical Survey Institute, map data held by map companies and so on, depending on the purpose. While, in the foregoing embodiments, data on a destination point is obtained by capturing coded-pattern information such as a two-dimensional barcode, this acquisition method may be combined with a method of key entry, or what-is-called manual entry, using an operating section.

An alternative structure is a combination of various functions such as storing the history of user's travel routes in a memory, and estimating map information for use this time on the basis of the preceding travel, or for a structure also serving as a mobile phone, predicting the presence or absence of the remaining of bargains in a destination shop via the Internet, grasping the business performance of a specific shop such as a famous noodle shop, or making various reservations by e-mail, which can be used as required.

The entire disclosure of Japanese Patent Application No. 2004-365517, filed Dec. 17, 2004 is expressly incorporated by reference herein.

What is claimed is:

1. A guidance information system comprising:
    at least one portable device including an image pickup section and the function of decoding coded-pattern information captured by the image pickup section; and
    a display having a display surface that displays information indicative of a destination point and a present-position of the display in a display form according to a coding system of coded-pattern information for use in the portable device and that carries coded-pattern information to which an error-correction code is added, the information indicative of the present-position of the display including information to determine a current floor of the present-position of the display, from a plurality of floors, upon which the display is located, wherein
    the portable device includes:
    a relative-position detection section that detects the relative change of the position of the portable device without contact;
    a destination-position-information obtaining section that decodes specified coded-pattern information of the destination point captured by the image pickup section to obtain the coordinate-position information of the destination point on the Earth;
    a map-information obtaining section that obtains map information corresponding to the coordinate-position information on the Earth obtained by the destination-position-information obtaining section;
    a present-position-information generating section that obtains information on the present position of the portable device on the basis of the output of the relative-position detection section;
    a calibration-information obtaining section that decodes specified coded-pattern information of the present-position of the display captured by the image pickup section to obtain calibration information for coordinate-position information on the Earth of the present position of the portable device, the present-position-information generating section calibrating the information on the present position of the portable device obtained on the basis of the output of the relative-position detection section according to the calibration information obtained by the calibration-information obtaining section; and
    a guidance-information generating section that generates guidance information for guidance from the present position of the portable device to the destination point on the basis of various information including the coordinate-position information on the Earth obtained by the destination-position-information obtaining section, the map information obtained by the map-information obtaining section, the information of the present-position of the display, including the current floor of the present-position of the display, and the information on the present position of the portable device generated by the present-position-information generating section.

2. The guidance information system according to claim 1, wherein the display carries coded-pattern information indicative of a destination point on a sheet-like member.

3. The guidance information system according to claim 1, wherein the display carries coded-pattern information indicative of a destination point on a book-like plurality of sheets.

4. The guidance information system according to claim 1, wherein the display carries coded-pattern information indicative of a destination point on a corresponding portion on a map.

* * * * *